United States Patent
Takenaka (10) Patent No.: US 11,080,543 B2
(45) Date of Patent: Aug. 3, 2021

(54) WALKING SUPPORT DEVICE, WALKING SUPPORT METHOD AND PROGRAM

(71) Applicant: HONDA MOTOR CO., LTD., Tokyo (JP)

(72) Inventor: Toru Takenaka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 67 days.

(21) Appl. No.: 16/492,350

(22) PCT Filed: Mar. 12, 2018

(86) PCT No.: PCT/JP2018/009389
§ 371 (c)(1),
(2) Date: Sep. 9, 2019

(87) PCT Pub. No.: WO2018/168730
PCT Pub. Date: Sep. 20, 2018

(65) Prior Publication Data
US 2020/0279123 A1 Sep. 3, 2020

(30) Foreign Application Priority Data

Mar. 15, 2017 (JP) .............................. JP2017-050149

(51) Int. Cl.
*G06K 9/00* (2006.01)
*G06K 9/32* (2006.01)
(Continued)

(52) U.S. Cl.
CPC ....... *G06K 9/3241* (2013.01); *G06K 9/00671* (2013.01); *G06K 9/4661* (2013.01); *G06T 15/506* (2013.01); *G06T 15/60* (2013.01)

(58) Field of Classification Search
CPC .... G06T 7/40; G06T 7/49; G06T 7/50; G06T 7/507; G06T 7/529; G06T 15/50;
(Continued)

(56) References Cited

U.S. PATENT DOCUMENTS

| 2011/0234631 A1 | 9/2011 | Kim et al. |
| 2014/0285667 A1* | 9/2014 | Aimura .................... G08G 1/16 348/148 |

(Continued)

FOREIGN PATENT DOCUMENTS

| CN | 103529639 A | 1/2014 |
| CN | 104115199 A | 10/2014 |

(Continued)

OTHER PUBLICATIONS

Machine translation of JP 2011-192037 A. (Year: 2011).*
(Continued)

*Primary Examiner* — Andrew W Johns
(74) *Attorney, Agent, or Firm* — Carrier Blackman & Associates, P.C.; William D. Blackman; Joseph P. Carrier (57) ABSTRACT

A walking support device includes a shape detector configured to detect a shape of a road surface on which a user moves, and a display controller configured to provide an auxiliary image emphasizing an uneven state of the road surface such that the auxiliary image is superimposed on the shape of the road surface on the basis of a result of the detection of the shape detector.

8 Claims, 5 Drawing Sheets

(51) Int. Cl.
  *G06K 9/46* (2006.01)
  *G06T 15/50* (2011.01)
  *G06T 15/60* (2006.01)

(58) Field of Classification Search
  CPC ... G06T 15/506; G06T 15/60; G06K 9/00671; G06K 9/3241; G06K 9/4661
  See application file for complete search history.

(56) References Cited

U.S. PATENT DOCUMENTS

| 2015/0224926 | A1  | 8/2015 | Mochizuki et al. |
| 2016/0253566 | A1* | 9/2016 | Stein et al. ............... G06T 7/40 348/148 |
| 2020/0031283 | A1* | 1/2020 | Nakasho et al. .......... B60R 1/00 |

FOREIGN PATENT DOCUMENTS

| CN | 104574365    A | 4/2015  |
| JP | 2005-148973  A | 6/2005  |
| JP | 2008-234473  A | 10/2008 |
| JP | 2009-163610  A | 7/2009  |
| JP | 2011-192037  A | 9/2011  |
| JP | 2013-517579  A | 5/2013  |
| JP | 2015-153057  A | 8/2015  |
| JP | 2016-067855  A | 5/2016  |
| JP | 2017-015485  A | 1/2017  |
| TW | M532865      U | 12/2016 |

OTHER PUBLICATIONS

PCT/ISA/210 from International Application PCT/JP2018/009389 with the English translation thereof.

Office Action, dated Nov. 10, 2020, issued over the corresponding Japanese Patent Application No. 2017-050149 with the English translation thereof.

Office Action, dated May 8, 2021, issued over the corresponding Chinese Patent Application No. 201880017420.7 with machine translation thereof in English obtained by Global Dossier.

* cited by examiner

WALKING SUPPORT DEVICE, WALKING SUPPORT METHOD AND PROGRAM

TECHNICAL FIELD

The present invention relates to a walking support device, a walking support method, and a program.

Priority is claimed on Japanese Patent Application No. 2017-050149, filed Mar. 15, 2017, the content of which is incorporated herein by reference.

BACKGROUND ART

A rendering technology which generates a three-dimensional virtual space created by a computer as a realistic image is known in the related art. For example, Patent Literature 1 has disclosed an image processing apparatus which aims to enable high speed execution of a plurality of processes that use rendering results.

CITATION LIST

Patent Literature

[Patent Literature 1]
Japanese Unexamined Patent Application, First Publication No. 2008-234473

SUMMARY OF INVENTION

Technical Problem

However, Patent Literature 1 which aims to speed up processing has not disclosed any specific method of utilizing the rendering technology. On the other hand, when a pedestrian walks on a road at night or when a pedestrian with weak vision walks, it is difficult to identify unevenness of the surface of the road and thus they may trip.

To cope with such a problem, there is demand for a solution utilizing augmented reality (AR) technology or virtual reality (VR) technology.

Aspects regarding the present invention have been made in view of the above facts and it is an object thereof to provide a walking support device, a walking support method, and a program which assist a user in identifying unevenness of a road surface while moving on the road surface.

Solution to Problem

To solve the above technical problem and achieve the relevant object, the present invention adopts the following aspects.

(1) An aspect of the present invention is a walking support device including a shape detector configured to detect a shape of a road surface on which a user moves and a display controller configured to provide an auxiliary image emphasizing an uneven state of the road surface such that the auxiliary image is superimposed on the shape of the road surface on the basis of a result of the detection of the shape detector.

(2) In the above aspect (1), the walking support device may further include a projection unit configured to project an image, wherein the display controller is configured to provide the auxiliary image by instructing the projection unit to project the auxiliary image to the road surface.

(3) In the above aspect (1) or (2), the auxiliary image may be an image that is assumed to be viewed by the user when a virtual light source radiates a predetermined pattern to the road surface.

(4) In any one of the above aspects (1) to (3), the display controller may be configured to calculate a shadow area which is an area shadowed when a virtual light source radiates light to the road surface and to provide information, which enables recognition of a position of the calculated shadow area, as the auxiliary image.

(5) In the above aspect (4), the display controller may be configured to provide the auxiliary image such that an area other than the shadow area is brighter than the shadow area.

(6) In any one of the above aspects (1) to (5), the display controller may be configured to calculate a distribution of luminance of the road surface that is viewed by the user when a virtual light source radiates light to the road surface and to provide information, which enables recognition of the calculated distribution, as the auxiliary image.

(7) An aspect of the present invention is a walking support method including detecting, by a control computer of a walking support device, a shape of a road surface on which a user moves and providing an auxiliary image emphasizing an uneven state of the road surface such that the auxiliary image is superimposed on the shape of the road surface on the basis of a result of the detection.

(8) An aspect of the present invention is a program causing a control computer of a walking support device to execute a process of detecting a shape of a road surface on which a user moves and a process of providing an auxiliary image emphasizing an uneven state of the road surface such that the auxiliary image is superimposed on the shape of the road surface on the basis of a result of the detection.

Advantageous Effects of Invention

According to the aspects regarding the present invention, it is possible to assist the user in identifying unevenness of the road surface while moving on the road surface.

DESCRIPTION OF EMBODIMENTS

Figure 1:
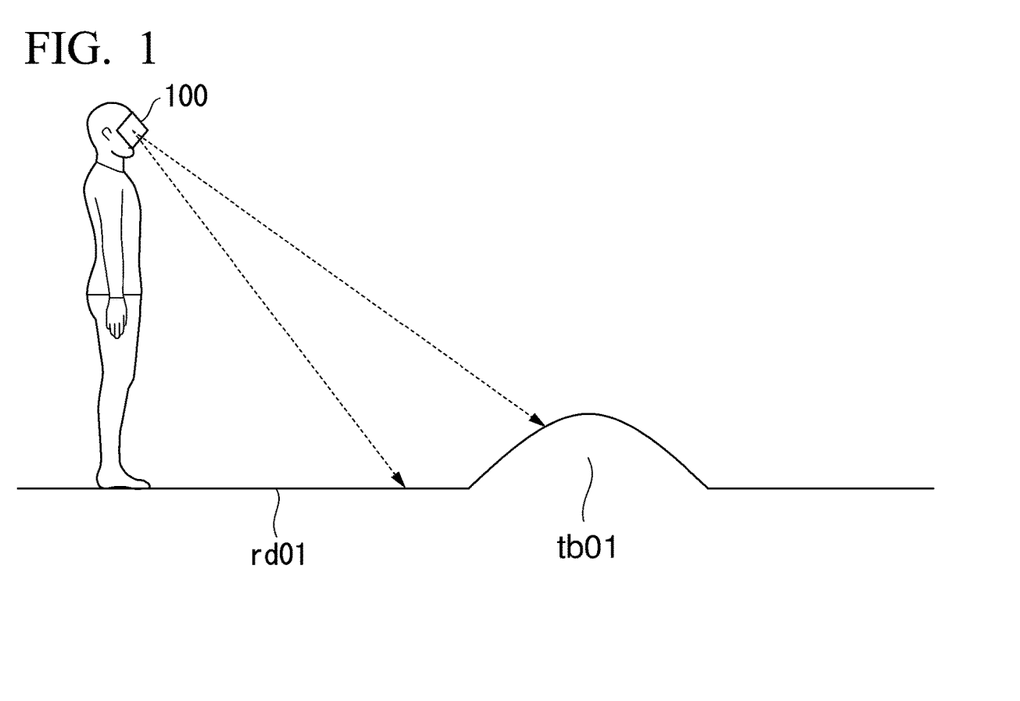
FIG. 1 is a schematic view of an embodiment.

First, an outline of an embodiment according to the present invention will be described. FIG. 1 is a schematic view of the embodiment. In an example of FIG. 1, a user wearing a walking support device 100 is walking on a walking surface rd01. The walking surface represents a surface on which pedestrians walk, and includes a floor surface, the ground, a road surface, a concrete surface, or the like. In front on the walking surface rd01, there is a convex portion tb01 where the walking surface is raised. The convex portion tb01 may be a raised portion of the walking surface itself or may be an object (for example, a rock) present on the walking surface. Here, in cases such as where the user's vision is weak or where vision is good but the surroundings are dark, the user may walk without being aware of the presence of the convex portion tb01 and may trip over the convex portion tb01.

The walking support device 100 according to the present embodiment detects the shape of the walking surface on which the user walks and provides an auxiliary image emphasizing the uneven state of the walking surface such that the auxiliary image is superimposed on the shape of the walking surface on the basis of the detection results. This assists the user in identifying unevenness of the walking surface while walking thereon and thus solves the problem described above.

Figure 2:
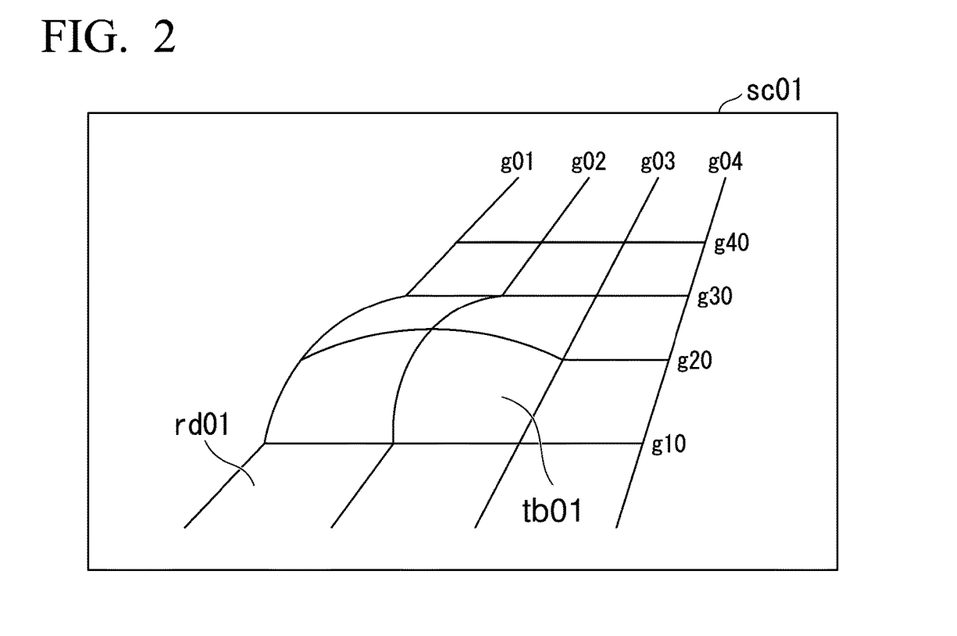
FIG. 2 is a view showing an example of display by a walking support device.

An example of display by the walking support device 100 according to the present embodiment will be described. FIG. 2 is a view showing an example of display by the walking support device 100 according to the present embodiment. "sc01" in FIG. 2 indicates a visual field that the user views through the walking support device 100. A walking surface rd01 and a convex portion tb01 are present in the visual field sc01. Here, the walking support device 100 displays an auxiliary image emphasizing the uneven state of the walking surface such that the auxiliary image is superimposed on the shape of the walking surface on the basis of the shape of the walking surface. In the example of FIG. 2, as an auxiliary image, lattice-like grid lines g01 to g04 and g10 to g40 are displayed such that they are superimposed on the walking surface rd01 and the convex portion tb01. In this manner, grid lines are displayed such that they are superimposed on the walking surface rd01 to emphasize the unevenness (the convex portion tb01) of the walking surface rd01, and thus the user can recognize the existence of the convex portion tb01 and walk safely even in a situation where the visibility is poor. The auxiliary image may have a stripe pattern in addition to a grid.

The auxiliary image may also be displayed as contour lines or may be displayed in varying colors depending on the height as shown on a map.

First Embodiment

Figure 3:
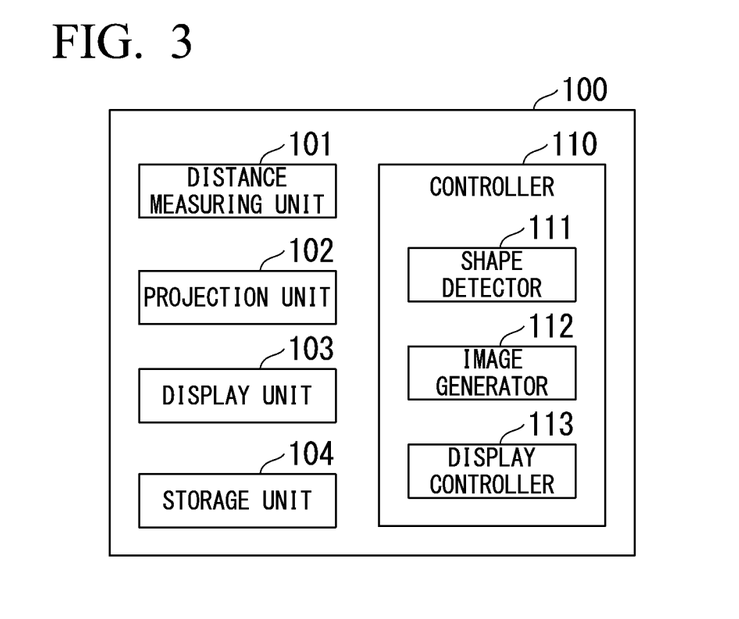
FIG. 3 is a block diagram showing an exemplary configuration of a walking support device according to a first embodiment.

Next, a configuration of a first embodiment will be described. FIG. 3 is a block diagram showing an exemplary configuration of the walking support device 100 according to the first embodiment of the present invention.

The walking support device 100 is an augmented reality (AR) device that displays additional information in a real space viewed by a user. The walking support device 100 may also be a virtual reality (VR) device that displays virtual reality. The walking support device 100 is, for example, a glasses-type display or a head-mounted display which is mounted on the head of the user. Further, the walking support device 100 may be shaped like a flashlight that the user uses while holding it in his or her hand or may be provided as a lighting device such as a headlight of a car. The walking support device 100 includes a distance measuring unit 101, a projection unit 102, a display unit 103, a storage unit 104, and a controller 110.

The distance measuring unit 101 measures the distance between the walking support device 100 and a measurement object. For example, the distance measuring unit 101 radiates laser light to the measurement object and measures the distance using the reflected light. The distance measuring unit 101 measures the distance to the measurement object by a triangular distance measurement method using triangulation or by a method (such as a phase difference distance method or a pulse propagation method) which measures the distance by measuring the time elapsed until the radiated light is reflected by the measurement object and then received. The distance measuring unit 101 radiates (sweeps) laser light to (over) a predetermined range and measures the distance to an object in the predetermined range. The distance measuring unit 101 may measure the distance to an object using other means without being limited to laser light. The distance measuring unit 101 outputs the measured distance to the walking surface to a shape detector 111.

The projection unit 102 projects the image input from a display controller 113 on the walking surface. The projection unit 102 may, alternatively, be referred to as an image projector. The projection unit 102 is, for example, a light valve type projector, and modulates and projects light from a light source using a light valve. More specifically, the projection unit 102 uses a transmissive liquid crystal system, a reflective liquid crystal system, or the like, and may also use other systems to perform projection.

The display unit 103 displays various images on a display on the basis of control of the display controller 113. The display unit 103 may display an image two-dimensionally on a transmissive display or may display an image three-dimensionally using a 3D display such as that of a polarized glasses type or a liquid crystal shutter glasses type. The display unit 103 may also display a stereoscopic image using an optical technique such as holography. It is to be noted that the display unit 103 is not an essential component and the user may directly view the image projected by the projection unit 102. In this case, the walking support device 100 does not have to be a glasses-type display or a head-mounted display. When the display unit 103 is provided, the projection unit 102 is not an essential component.

The storage unit 104 includes, for example, a hard disc drive (HDD), a flash memory, an electrically erasable programmable read only memory (EEPROM), a read only memory (ROM), or a random access memory (RAM), and stores a variety of programs to be executed by a processor such as a CPU included in the walking support device 100, results of processing executed by the processor, and the like. The storage unit 104 holds the image input from an image generator 112 and outputs the image to the display controller 113 in response to a request from the display controller 113. The storage unit 104 may also output an image, which is registered in advance from the outside, to the display controller 113.

The controller 110 controls various functions of the walking support device 100. The controller 110 is realized, for example, by a processor such as a central processing unit (CPU) executing a program. Some or all of such functions may be realized by hardware such as a large scale integration (LSI), an application specific integrated circuit (ASIC), or a field-programmable gate array (FPGA) or may be realized by hardware and software in cooperation. The controller 110 includes the shape detector 111, the image generator 112, and the display controller 113.

The shape detector 111 detects an uneven shape of the walking surface on the basis of the distance to the walking surface input from the distance measuring unit 101. The shape detector 111 extracts a shape that is estimated to be a plane, and estimates the height of the walking support device 100 on the basis of the distances to a plurality of locations on the plane portion. Then, the shape detector 111 detects a three-dimensional shape of the walking surface on the basis of the height of the walking support device 100 and the distances from the walking support device 100. The shape detector 111 may improve the accuracy and efficiency of shape detection, for example, using a known shape detection technique such as template matching, corner detection, or edge detection.

The image generator 112 generates an auxiliary image (and its subject matter) that is to be displayed such that it is superimposed on the walking surface. The auxiliary image is an image which is additionally displayed on the real space viewed by the user. The auxiliary image may be an image which is additionally displayed in a virtual space displayed by the walking support device 100. The auxiliary image may be a still image of one frame or a moving image (video) including a plurality of frames. The auxiliary image is, for example, that of lattice-like grid lines described above. Other examples will be described later. The image generator 112 outputs the generated auxiliary image to the storage unit 104.

The display controller 113 controls functions relating to image display of the walking support device 100. Specifically, the display controller 113 controls the projection unit 102 or the display unit 103 such that various images including the auxiliary image are displayed. Details of the operation of the display controller 113 will be described later.

Figure 4:
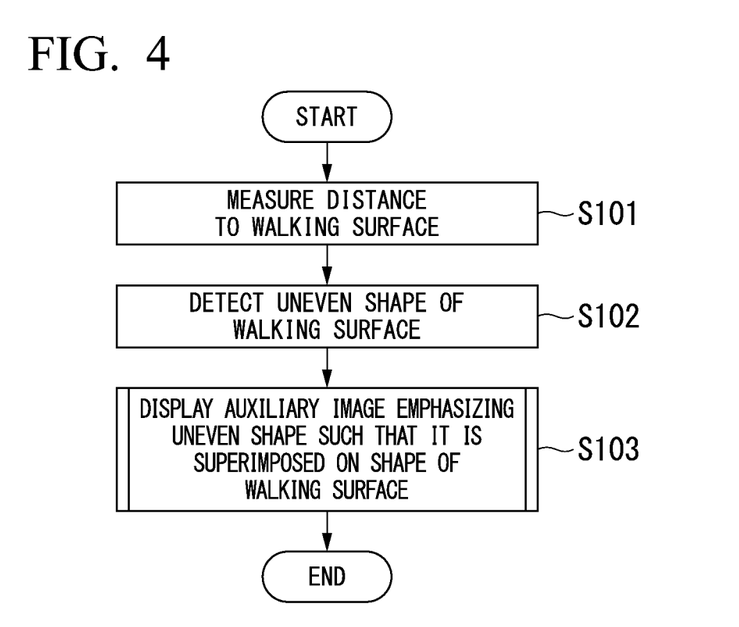
FIG. 4 is a flowchart illustrating an example of processing of the walking support device according to the first embodiment.

Next, the operation of the walking support device 100 according to the present embodiment will be described. FIG. 4 is a flowchart showing an example of processing of the walking support device 100 according to the present embodiment.

First, the distance measuring unit 101 measures the distance to the walking surface (step S101). Specifically, the distance measuring unit 101 radiates laser light to the walking surface and measures the distance to the walking surface using the reflected light as described above. The distance measuring unit 101 outputs the distance information of distances to the walking surface in a predetermined range, which are measured by radiating (sweeping) laser light to (over) the predetermined range of the walking surface, to the shape detector 111.

Next, the shape detector 111 detects an uneven shape of the walking surface on the basis of the distance information of distances to the walking surface input from the distance measuring unit 101 (step S102). Specifically, the shape detector 111 calculates a Z coordinate at each point on the walking surface when the walking surface is assumed to be on the XY plane and detects a three-dimensional shape of the walking surface as a set of Z coordinates as described above.

Next, the walking support device 100 generates (acquires) an auxiliary image emphasizing the uneven state of the walking surface on the basis of the uneven shape of the walking surface detected by the shape detector 111 and displays the auxiliary image such that it is superimposed on the shape of the walking surface (step S103). Details of this process will be described later. Then, the walking support device 100 ends the processing of FIG. 4.

Figure 5:
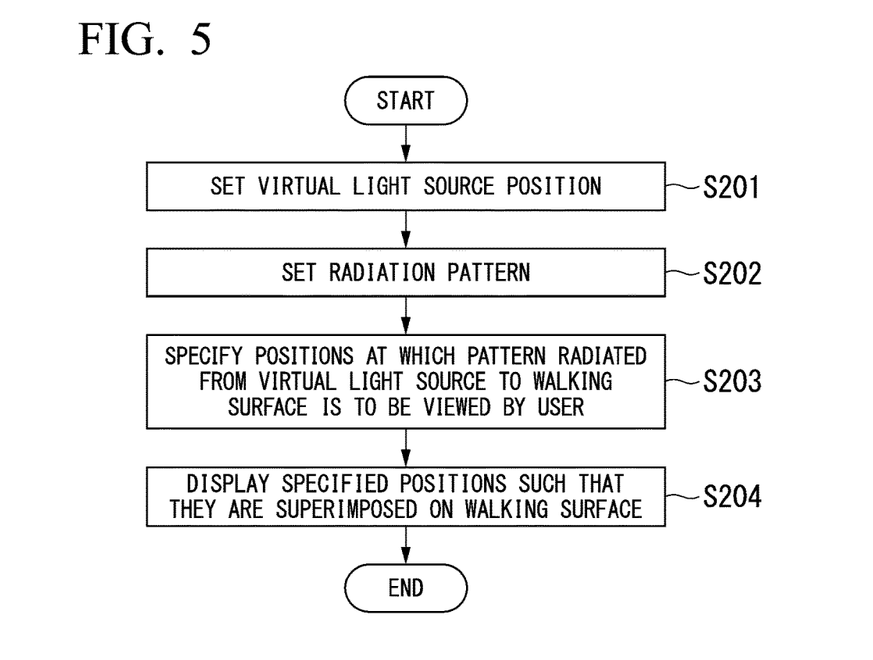
FIG. 5 is a first flowchart showing an example of an auxiliary image display process of the walking support device according to the first embodiment.
Figure 6:
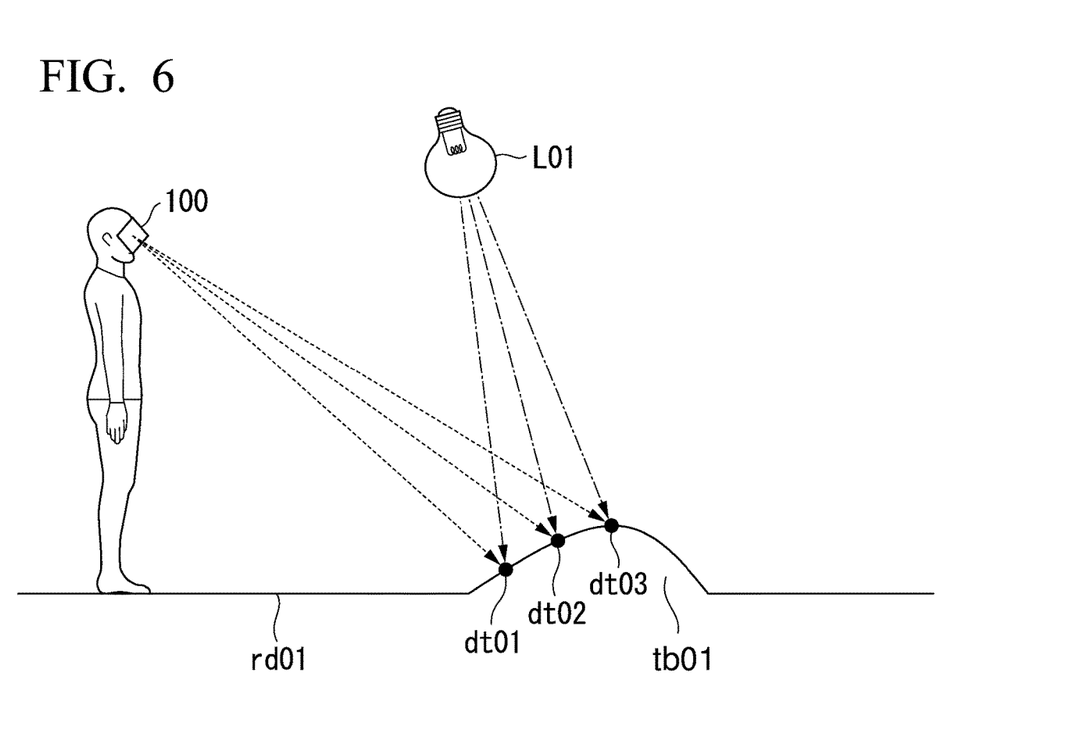
FIG. 6 is a first diagram showing exemplary display of an auxiliary image in the walking support device according to the first embodiment.

Subsequently, an example of the process of step S103 in FIG. 4 will be described with reference to FIGS. 5 and 6. FIG. 5 is a first flowchart showing an example of the auxiliary image display process of the walking support device 100 according to the present embodiment. FIG. 6 is a first diagram showing exemplary display of an auxiliary image in the walking support device 100 according to the present embodiment.

First, the display controller 113 sets the position of a virtual light source in order to determine the display position of the auxiliary image (step S201). The virtual light source is a virtual one that is installed in a virtual space by the walking support device 100. In the example of FIG. 6, L01 indicates the virtual light source. The virtual light source L01 virtually radiates a specific pattern to the convex portion tb01 on the walking surface rd01. The virtual light source L01 and the radiated light of the virtual light source L01 are virtual ones that are not viewed by the user. The display controller 113 sets an appropriate position of the virtual light source L01 on the basis of the shape of the convex portion tb01. The display controller 113 sets the position of the virtual light source L01, for example, directly above a center position of the convex portion tb01. Alternatively, the display controller 113 sets the virtual light source L01, for example, at a position facing the slope on the user side of the convex portion tb01.

Next, the display controller 113 sets a pattern of the auxiliary image that is to be radiated by the virtual light source (step S202). The pattern of the auxiliary image includes a pattern display such as a dot-like or stripe-like pattern, other character display, a geometric pattern, or the like, in addition to the lattice-like grid lines described above. The thickness, the interval, the image color, the brightness, and the like of the grid lines can be changed as appropriate. The display controller 113 may also acquire ambient environment information (such as a luminance) or user movement information (such as a walking speed and landing timing) from outside and use the acquired information as parameters for setting the pattern of the auxiliary image or the position of the virtual light source L01 described above.

Next, the display controller 113 specifies positions at which the pattern of the auxiliary image radiated from the virtual light source to the walking surface is to be viewed by the user (step S203). Specifically, the display controller 113 causes the pattern of the auxiliary image set in step S202 to be virtually radiated from the virtual light source to the walking surface rd01 and the convex portion tb01 (one-dot dashed arrows in FIG. 6). The display controller 113 obtains coordinates (dt01, dt02, and dt03 in FIG. 6) of the intersections between the radiated auxiliary image and the walking surface rd01 and the convex portion tb01. The radiation range of the auxiliary image may be the walking surface rd01 in a predetermined range including the convex portion tb01 or may be only the convex portion tb01.

Next, the display controller 113 sets the coordinates of the auxiliary image on the walking surface rd01 and the convex portion tb01 obtained in step S203 as display positions at which the auxiliary image is viewed by the user and causes the display unit 103 or the projection unit 102 to display the auxiliary image such that it is superimposed on the walking surface rd01 and the convex portion tb01 (step S204). When causing the display unit 103 to display the auxiliary image, the display controller 113 performs control such that the set auxiliary image (a set of dt01 to dt03 in FIG. 6) is displayed such that it is superimposed as an additional image (an extended image) on the walking surface rd01 and the convex portion tb01 which the user views through the transmissive display. When the projection unit 102 is caused to display the auxiliary image, the projection unit 102 projects the points set on the walking surface rd01 and the convex portion tb01 (the set of dt01 to dt03 in FIG. 6) on the basis of the control of the display controller 113. As a result, the pattern of the auxiliary image is displayed on the walking surface rd01 and the convex portion tb01, and the user can view the displayed auxiliary image. This is the end of the description of FIGS. 5 and 6.

Figure 7:
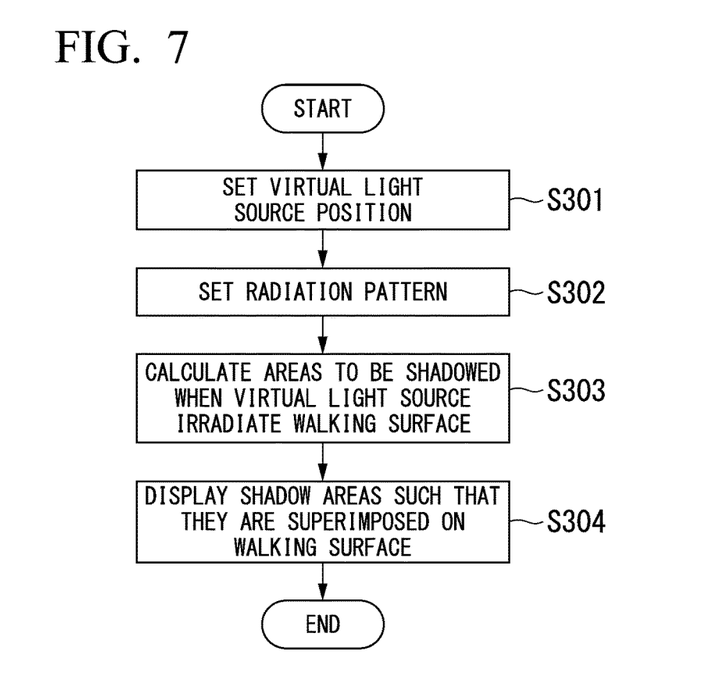
FIG. 7 is a second flowchart showing an example of the auxiliary image display process in the walking support device according to the first embodiment.
Figure 8:
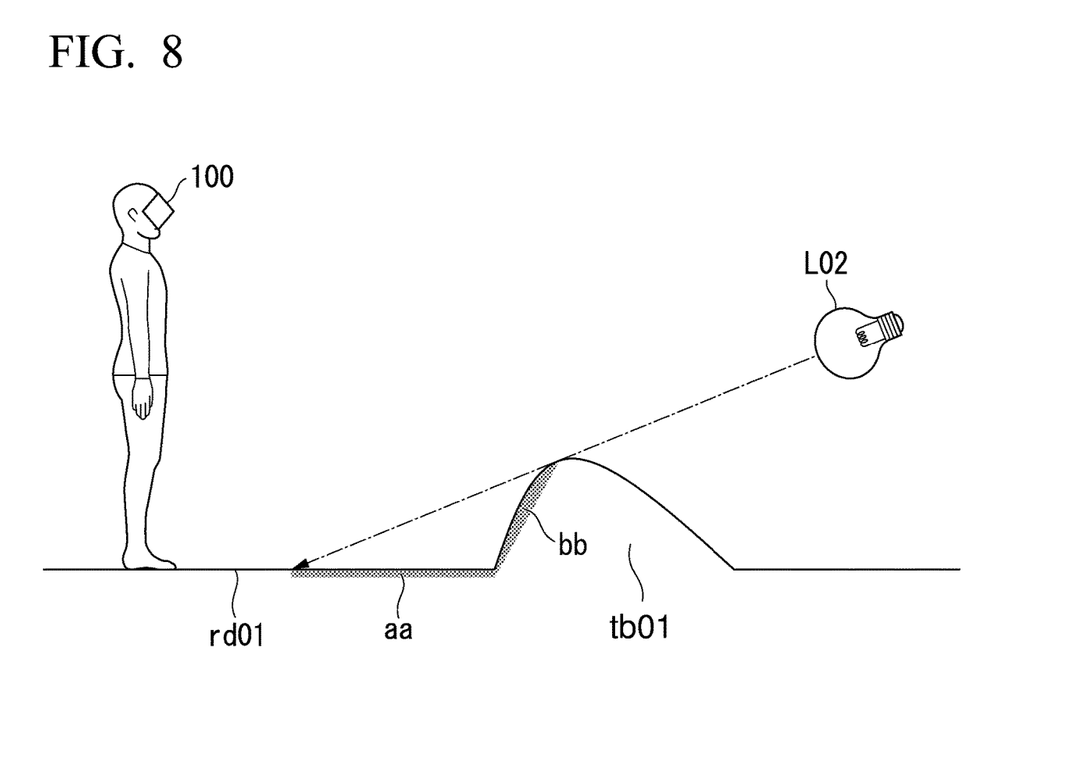
FIG. 8 is a second diagram showing exemplary display of an auxiliary image in the walking support device according to the first embodiment.

Subsequently, another example of the process of step S103 in FIG. 4 will be described with reference to FIGS. 7 and 8. FIG. 7 is a second flowchart showing an example of the auxiliary image display process of the walking support device 100 according to the present embodiment. FIG. 8 is a second diagram showing exemplary display of an auxiliary image in the walking support device 100 according to the present embodiment.

First, the display controller 113 sets the position of a virtual light source in order to determine the display position of an auxiliary image (step S301). This process is similar to the process of step S201 of FIG. 5. However, in this process, to obtain areas that are to be shadowed when the virtual light source irradiates the walking surface, the display controller 113 sets the position of the virtual light source L02 such that the virtual light source radiates virtual light toward the user over the convex portion tb01 from the side away from the user as shown in FIG. 8.

Next, the display controller 113 sets a pattern of the auxiliary image that is to be radiated by the virtual light source (step S302). In this process, to obtain areas that are to be shadowed when the virtual light source irradiates the walking surface, the display controller 113 sets no radiation pattern (only a radiation of uniform virtual light).

Next, the display controller 113 calculates areas that are to be shadowed when the virtual light source irradiates the walking surface (step S303). As shown in FIG. 8, the display controller 113 causes the virtual light source L02 to radiate virtual light and calculates areas that are to be shadowed on the walking surface rd01 and the convex portion tb01 due to the convex portion tb01 at this time. In the example of FIG. 8, an area aa on the walking surface rd01 and an area bb on the convex portion tb01 are areas that are to be shadowed. The display controller 113 calculates the shadow areas on the basis of the position of the virtual light source L02, the radiation direction of the virtual light, and the three-dimensional shapes of the walking surface rd01 and the convex portion tb01.

Next, the display controller 113 causes the display unit 103 or the projection unit 102 to display the calculated shadow areas such that they are superimposed on the walking surface (step S304). When causing the display unit 103 to display the shadow areas, the display controller 113 performs control such that the calculated shadow areas aa and bb are displayed such that they are superimposed as additional images (extended images) on the walking surface rd01 and the convex portion tb01 which the user views through the transmissive display. When the projection unit 102 is caused to display the shadow areas, the projection unit 102 projects the shadow areas aa and bb on the walking surface rd01 and the convex portion tb01 on the basis of the control of the display controller 113. As a result, the shadow areas are displayed on the walking surface rd01 and the convex portion tb01, and the user can view the displayed shadow areas. In addition, the display controller 113 may set the brightness of the shadow areas such that the shadow areas are brighter than areas other than the shadow areas on the walking surface. This makes it possible to clearly view the shadow areas even when the surroundings are dark. Conversely, the display controller 113 may set the brightness of the shadow areas such that the shadow areas are darker than areas other than the shadow areas on the walking surface. This also enhances the contrast of the shadow areas, and thus makes it possible to clearly view the shadow areas. The display controller 113 may also cause the shadow areas to be displayed or projected in a color different from that of the other areas.

Figure 9:
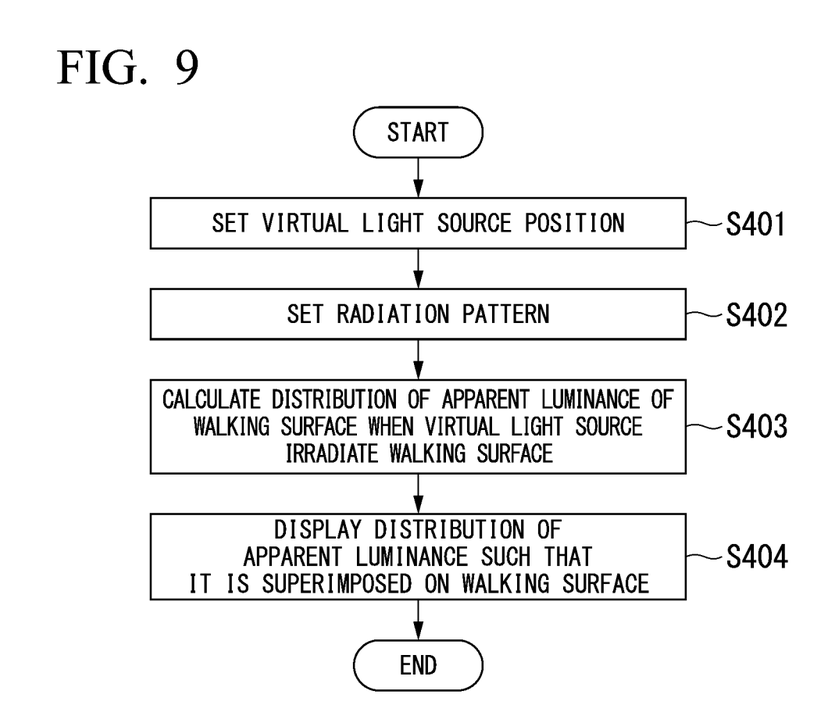
FIG. 9 is a third flowchart showing an example of the auxiliary image display process in the walking support device according to the first embodiment.

Subsequently, another example of the process of step S103 in FIG. 4 will be described with reference to FIG. 9. FIG. 9 is a third flowchart showing an example of the auxiliary image display process of the walking support device 100 according to the present embodiment.

First, the display controller 113 sets the position of a virtual light source in order to determine the display position of an auxiliary image (step S401). This process is similar to the process of step S201 of FIG. 5 or step S301 of FIG. 7.

Next, the display controller 113 sets a pattern of the auxiliary image that is to be radiated by the virtual light source (step S402). This process is similar to the process of step S202 of FIG. 5 or step S302 of FIG. 7.

Next, the display controller 113 calculates a distribution of the brightness of the walking surface that is viewed by the user when the virtual light source irradiates the walking surface (step S403). Specifically, the display controller 113 obtains an incident angle of light from the virtual light source at each point on the walking surface, and then obtains the intensity of light from each point on the walking surface toward the user's eyes (the apparent luminance thereof) by using predetermined diffusion characteristics.

Next, the display controller 113 causes the display unit 103 or the projection unit 102 to display the calculated distribution of the apparent luminance such that the distribution is superimposed on the walking surface (step S404). The display controller 113 may also distribute colors that are to be displayed or projected (casted) according to the distribution of the apparent luminance.

As described above, the walking support device 100 according to the present embodiment includes the shape detector 111 configured to detect a shape of a road surface on which a user moves, and the display controller 113 configured to provide an auxiliary image emphasizing an uneven state of the road surface such that the auxiliary image is superimposed on the shape of the road surface on the basis of a result of the detection of the shape detector 111. Thereby, it is possible to assist the user in identifying unevenness of the road surface and walking safely on the road surface.

The walking support device 100 according to the present embodiment may further include the projection unit 102 configured to project an image, wherein the display controller 113 is configured to provide the auxiliary image by instructing the projection unit 102 to project the auxiliary image to the road surface. Thereby, the user can view visual information without via a glasses-type display or the like and it is possible to assist the user in identifying unevenness of the road surface while walking on the road surface.

The auxiliary image according to the present embodiment may be an image that is assumed to be viewed by the user when a virtual light source radiates a predetermined pattern to the road surface. Thus, by adjusting the position of the virtual light source, the user can more easily identify unevenness of the road surface.

In the walking support device 100 according to the present embodiment, the display controller 113 may be configured to calculate a shadow area which is an area shadowed when a virtual light source radiates light to the road surface and to provide information, which enables recognition of a position of the calculated shadow area, as the auxiliary image. Thereby, the user can view the shadow areas and more easily identify unevenness of the road surface.

In the walking support device 100 according to the present embodiment, the display controller 113 may be configured to provide the auxiliary image such that an area other than the shadow area is brighter than the shadow area. Thereby, the user can easily identify unevenness of the road surface in cases such as where the surroundings are dark.

In the walking support device 100 according to the present embodiment, the display controller 113 may be configured to calculate a distribution of luminance of the road surface that is viewed by the user when a virtual light source radiates light to the road surface and to provide information, which enables recognition of the calculated distribution, as the auxiliary image. Thereby, the user can view the distribution of luminance of the road surface and can more easily identify unevenness of the road surface.

An aspect of the present invention is expressed as a walking support method including detecting, by a control computer of a walking support device, a shape of a road surface on which a user moves and providing an auxiliary image emphasizing an uneven state of the road surface such that the auxiliary image is superimposed on the shape of the road surface on the basis of a result of the detection.

An aspect of the present invention is also expressed as a program causing a control computer of a walking support device to execute a process of detecting a shape of a road surface on which a user moves and a process of providing an auxiliary image emphasizing an uneven state of the road surface such that the auxiliary image is superimposed on the shape of the road surface on the basis of a result of the detection.

Although embodiments of the present invention have been described above in detail with reference to the drawings, the specific configurations thereof are not limited to those of the above embodiments and also include design changes or the like without departing from the spirit of the present invention. For example, the order of processing procedures, sequences, flowcharts, and the like in each embodiment may be changed as long as no contradiction arises.

For example, the walking support device 100 can be applied not only to walking but also when the user moves by riding a car, a bicycle or the like.

In an aspect of the present invention, various changes can be made within the scope defined by the claims, and embodiments obtained by appropriately combining technical means disclosed in different embodiments are also included in the technical scope of the present invention. Configurations in which elements which are described in the above embodiments or modifications and exhibit the same effects are replaced with each other are also included in the technical scope of the present invention.

Further, the above embodiments may be used in combination with a walking assist device. The walking assist device is a walking training device that supports efficient walking based on an "inverted pendulum model." In the walking assist device, angular sensors provided in left and right motors detect the movement of the hip joint during walking and a control computer drives the motors. In this manner, the walking assist device performs guidance of swinging of the legs through bending of the hip joint and guidance of kicking of the legs through extension thereof.

Using the present embodiment in combination with the walking assist device, it is possible to perform more effective walking support through both identification of the shape of the walking surface and emphasized display of the uneven shape which cannot be covered by the walking assist device.

REFERENCE SIGNS LIST

100 Walking support device
101 Distance measuring unit
102 Projection unit
103 Display unit
104 Storage unit
110 Controller
111 Shape detector
112 Image generator
113 Display controller

The invention claimed is:

1. A walking support device comprising:
   a shape detector configured to detect a shape of a road surface on which a user moves, and
   a display controller configured to provide, when an uneven state of the road surface is detected, an auxiliary image emphasizing the uneven state of the road surface such that the auxiliary image is superimposed on the shape of the road surface on the basis of a result of the detection of the shape detector.

2. The walking support device according to claim 1, further comprising an image projector configured to project the auxiliary image,
   wherein the display controller is configured to provide the auxiliary image by instructing the image projector to project the auxiliary image to the road surface.

3. The walking support device according to claim 1, wherein the auxiliary image is an image that is provided to be viewed by the user when a virtual light source radiates a predetermined pattern to the road surface.

4. The walking support device according to claim 1, wherein the display controller is configured to calculate a shadow area which is an area shadowed when a virtual light source radiates light to the road surface and to provide information, which enables recognition of a position of the calculated shadow area, as the auxiliary image.

5. The walking support device according to claim 4, wherein the display controller is configured to provide the auxiliary image such that an area other than the shadow area is brighter than the shadow area.

6. The walking support device according to claim 1, wherein the display controller is configured to calculate a distribution of luminance of the road surface that is viewed by the user when a virtual light source radiates light to the road surface and to provide information, which enables recognition of the calculated distribution, as the auxiliary image.

7. A walking support method comprising steps of:
   detecting, by a control computer of a walking support device, a shape of a road surface on which a user moves; and
   providing an auxiliary image for emphasizing, when an uneven state of the road surface is detected, said uneven state of the road surface such that the auxiliary image is superimposed on the shape of the road surface on the basis of a result of the detection.

8. A program embodied on a non-transitory computer-readable medium, said program configured to cause a control computer of a walking support device to execute:

a process of detecting a shape of a road surface on which a user moves; and a process of providing an auxiliary image emphasizing, when an uneven state of the road surface is detected, said uneven state of the road surface such that the auxiliary image is superimposed on the shape of the road surface on the basis of a result of the detection.

\* \* \* \* \*